(12) United States Patent
Boixadera et al.

(10) Patent No.: US 9,356,766 B2
(45) Date of Patent: May 31, 2016

(54) ENABLING HALF DUPLEX FREQUENCY DIVISION DUPLEX (HD-FDD) OPERATION OF USER EQUIPMENTS IN FULL DUPLEX FREQUENCY DIVISION DUPLEX (FD-FDD) NETWORK

(71) Applicants: MSTAR SEMICONDUCTOR, INC. (CAYMAN ISLANDS), Grand Cayman (KY); MStar Software R&D (Shenzhen) Ltd., ShenZhen (CN); MStar Semiconductor, Inc., Hsinchu Hsien (TW)

(72) Inventors: Francesc Boixadera, Cambridge (GB); Cyril Valadon, Herts (GB)

(73) Assignees: MSTAR SEMICONDUCTOR, INC. (CAYMAN ISLANDS), Grand Cayman (KY); MSTAR SOFTWARE R&D (SHENZHEN) LTD., Shenzhen (CN); MSTAR SEMICONDUCTOR, INC., Hsinchu Hsien (TW)

( * ) Notice: Subject to any disclaimer, the term of this patent is extended or adjusted under 35 U.S.C. 154(b) by 100 days.

(21) Appl. No.: 13/669,744

(22) Filed: Nov. 6, 2012

(65) Prior Publication Data

US 2013/0128782 A1    May 23, 2013

Related U.S. Application Data

(60) Provisional application No. 61/560,900, filed on Nov. 17, 2011.

(51) Int. Cl.
*H04J 1/00* (2006.01)
*H04L 5/16* (2006.01)
(Continued)

(52) U.S. Cl.
CPC ............. *H04L 5/16* (2013.01); *H04L 5/0091* (2013.01); *H04L 5/0007* (2013.01); *H04L 5/0053* (2013.01);
(Continued)

(58) Field of Classification Search
CPC ..... H04W 84/18; H04W 24/02; H04W 48/10; H04W 4/00; H04W 28/18; H04W 72/0486; H04B 7/14; H04J 1/00; H04L 5/0007
USPC ................ 370/468, 455, 281, 335, 235, 255; 455/436, 423
See application file for complete search history.

(56) References Cited

U.S. PATENT DOCUMENTS

| 2005/0171984 | A1* | 8/2005 | Wang ................ H04W 72/0486 708/100 |
| 2007/0041347 | A1* | 2/2007 | Beale .................... H04W 48/10 370/335 |

(Continued)

OTHER PUBLICATIONS

"Identification of standards impacts of low cost LTE UEs", Source: IPWireless Inc, Contribution #R1-113438, 3GPP TSG RAN WG1 Meeting #66bis, Zuhai, China, Oct. 10-14, 2011.*

(Continued)

*Primary Examiner* — Chi H Pham
*Assistant Examiner* — Shailendra Kumar
(74) *Attorney, Agent, or Firm* — WPAT, PC; Justin King

(57) ABSTRACT

The current invention provides simplifications to the user equipment (UE) radio front end module for the cellular handset or dongle through modification of the existing 3GPP specifications for LTE and WCDMA/HSPA+ in order to support half duplex (HD) operation. The option to support HD operation is provided without mandating upgrades to all existing base stations that have already been deployed. The instant invention further prevents HD UEs from attaching to any base stations which do not support HD operations. The instant invention further provides inter-frequency cell search periods for enabling HD UEs to communicate with any base stations/cells supporting the HD operations. The instant invention further enables the HSPA+ system to support the HD-FDD mode.

13 Claims, 5 Drawing Sheets

(51) Int. Cl.
  H04W 24/02    (2009.01)
  H04W 48/10    (2009.01)
  H04W 28/18    (2009.01)
  H04W 84/18    (2009.01)
  H04W 72/04    (2009.01)
  H04L 5/00     (2006.01)
  H04L 5/14     (2006.01)

(52) U.S. Cl.
  CPC .............. *H04L 5/1469* (2013.01); *H04W 24/02* (2013.01); *H04W 28/18* (2013.01); *H04W 48/10* (2013.01); *H04W 72/0486* (2013.01); *H04W 84/18* (2013.01)

(56) References Cited

U.S. PATENT DOCUMENTS

| | | | | |
|---|---|---|---|---|
| 2009/0268645 A1* | 10/2009 | Chindapol | ............ | H04L 5/0007 370/281 |
| 2010/0195501 A1* | 8/2010 | Tynderfeldt | .......... | H04W 28/18 370/235 |
| 2012/0120849 A1* | 5/2012 | Kazmi | ................. | H04W 24/02 370/255 |
| 2012/0184253 A1* | 7/2012 | Hsu | ........................ | H04W 4/00 455/414.1 |

OTHER PUBLICATIONS

"Half Duplex FDD in LTE", Source: Ericsson, Nokia, and Nokia Siemens Networks, Contribution #R1-080534, 3GPP TSG RAN WG1 meeting #51bis, Seville, Spain, Jan. 14-18, 2008.*

Ericsson, Nokia, and Nokia Siemens Networks, Half Duplex FDD in LTE, R1-080534, 3GPP TSG RAN WG1 meeting #51bis, Seville, Spain, Jan. 14-18, 2008.*

Ericsson, Nokia, and Nokia Siemens Networks, Half Duplex FDD in LTE, 3GPP TSG RAN WG1 meeting #51bis, Seville, Spain, Jan. 14-18, 2008, R1-080534.*

3GPP, Universal Mobile Telecommunications System (UMTS); Spreading and modulation (FDD), Dec. 2003, 3GPP, TS 25.213 version 5.5.0 Release 5.*

IPWireless Inc., Identification of standards impacts of low cost LTE UEs, 3GPP TSG RAN WG1 Meeting #66bis, Zuhai, China, Oct. 10-14, 2011, R1-113438.*

* cited by examiner

ENABLING HALF DUPLEX FREQUENCY DIVISION DUPLEX (HD-FDD) OPERATION OF USER EQUIPMENTS IN FULL DUPLEX FREQUENCY DIVISION DUPLEX (FD-FDD) NETWORK

FIELD OF THE INVENTION

The present invention relates to a wireless communication network and signaling information for efficient half duplex frequency division duplex (HD-FDD) operation.

BACKGROUND OF THE INVENTION

Over the recent years, the functionality and complexity of wireless communication devices such as mobile handsets or computer dongles has been increasing along different axes. Wireless communication devices may have multiple built-in wireless systems such as a cellular modem, Bluetooth® short range wireless technology, GPS/GNSS, and WiFi/802.11. Handsets and dongles are usually referred to in the 3GPP specifications as User Equipment (UE).

A cellular modem in a UE will typically be multimode (supporting all or a subset of GSM/GPRS/EDGE/WCDMA/TD-SCDMA/TD-LTE/FD-LTE), multiband, and may additionally support receiver (Rx) and/or transmitter (Tx) diversity. Providing such a complex set of wireless functionality within a handset is a challenging engineering and integration effort in order to meet the significant constraints in terms of size, cost, and power consumption when compared to those of existing simpler UEs supporting a much smaller set of functionality.

A UE can be requested to operate in Full Duplex (FD) mode, where Rx and Tx operations are concurrent, or in Half Duplex (HD) mode, where Rx and Tx operations never occur simultaneously. In a Full Duplex Frequency Division Duplex (FD-FDD) system, the UE receiver and transmitter operate simultaneously on different frequencies, as shown in FIG. 1. The different frequencies provide the necessary separation between uplink and downlink signal paths.

One method of providing Half-Duplex operation while using the same carrier frequency is Time Division Duplex (TDD) where the time domain provides the uplink and downlink separation. Alternatively different carrier frequencies can be used for a Half Duplex FDD (HD-FDD) where uplink and downlink communications are not only on distinct frequencies but are also separated in the time domain. By scheduling UEs at mutually exclusive times transmission resources can be fully utilized. The base station is effectively working in full-duplex while the UEs operate in HD-FDD mode.

FD-FDD operation usually requires a duplexer on the Tx antenna as well as one filter on the diversity antenna for each band. The more FD-FDD bands one UE supports, the more filters and duplexers it requires, which is only sustainable if the number of bands supported remains small. Duplexers and filters are commonly designed using Surface Acoustic Wave (SAW) technology or Bulk Acoustic Wave (BAW) technologies. Furthermore, additional package and Printed Circuit Boards (PCB) costs are required because of bulky components. In short, it is foreseeable that with developments on a larger number of multiple networks, more costs and complexities would occur in the designs of UE if FD operation is a requirement. Both WCDMA/HSPA+ and FDD LTE operate in full duplex mode (some standardization work has already been performed in 3GPP to specify the HD operation mode for FDD LTE but this work is incomplete). For more information, see 3GPP contribution R1-113438, "Identification of standards impacts of low cost LTE UEs", IP Wireless Inc., 3GPP TSG RAN1 67 bis.

On the contrary, HD-FDD and HD-TDD solutions are amenable to filter-less receiver implementations, which can be implemented using a simpler, more cost-efficient approach whose complexity does not scale with the number of HD frequency bands supported. For example, see "Highly Integrated and Tunable RF Front Ends for Reconfigurable Multiband Transceivers: A Tutorial", by H. Darabi et al., IEEE TRANSACTIONS ON CIRCUITS AND SYSTEMS—I: REGULAR PAPERS, VOL. 58, NO. 9, SEPTEMBER 2011. GSM/GPRS/EDGE UEs typically operate in HD-FDD mode, whereas TD-LTE and TD-SCDMA/HSPA operate in (TD-) TDD mode.

Study has been done on different aspects of the transceiver and front end module complexity associated to multiband, multimode, multi-antenna UEs. Such study can be found in "Half duplex/full duplex LTE 800 handsets", by GSM Association Spectrum Management Group on 2008 focusing on the RF cost and performance implications of supporting half duplex FDD for LTE 800 in Europe@, RTT UK, and "3G-4G Evolution Multimode Modems", by Qualcomm 4G World on 2011, "LTE Spectrum Strategies and Forecasts to 2016" by Informa Telecoms and Media, Webinar, on July 2011, and 'WCDMA for UMTS', by Harri Holma and Antti Toskala, 5th edition.

FD-FDD Operation in Legacy Transceiver Implementations

A UE typically consists of a cellular baseband modem, a power management unit, a radio transceiver chip, one or more radio amplifiers, and a front end module. The front end module contains a number of antennas, a set of passive filters and duplexers, and a set of antenna switches.

On a typical legacy receiver implementation for a front end module supporting multi-mode, multi-band, multi-antenna in one device, complexity grows linearly with the number of supported full duplex and half duplex frequency bands (NFD and NHD, respectively) and supported number of antennas (NA) as follows:

NA antennas

NPA power amplifiers (PA), typically fewer than (NFD+NHD). Generally one power amplifier is able to support a group of frequency bands located over the same frequency region. Wideband PAs are now becoming available, so this number can be small (for example, two wideband PAs and two PA switches might be needed on a handset covering between 700 and 2600 MHz).

NFD duplexers and (NA−1)×NFD Rx filters to enable concurrent Rx/Tx for all the Full Duplex operation paired FDD bands (FD-FDD), on the assumption that only one antenna is used for Tx operation and all NA antennas are used for Rx operation.

(NA×NHD) Rx filters to cover all the bands in which HD operation is performed.

NA SPMT (Single Pole Multiple Throw) antenna switches, each with between (NHD+NFD+NPA) throws. A larger number of throws increases cost and degrades performance.

The PCB footprint for the modem grows with the number of components.

The total number of Rx paths (NA×(NHD+NFD)) requires an equal number of Low-Noise Amplifiers (LNAs) on-chip and also increases the transceiver chip pin count. These factors also increase the total cost.

Advantages and limitations of filter-less transceiver implementations

Recent developments to radio transceiver design have enabled the implementation of filter-less front end modules, which are characterized by the absence of any Rx filter between each antenna and the associated Rx part of the transceiver. This does not come without a challenge (as detailed in "Identification of standards impacts of low cost LTE UEs" cited above) since such receiver implementations will require far more linear LNAs in order to avoid receiver de-sense by out-of-band Rx blockers, which are no longer being attenuated by a Rx filter. Filter-less implementations for GSM, GPRS and EDGE are already in existence.

As shown in FIG. 2, a dual-PA traditional implementation is supporting the 4 bands in the 700-1000 MHz region, 4 bands in the 1700-2.1 GHz region and 4 bands in the 2.2-2.6 GHz regions might require as many as 2×12=24 Rx filters, one SP14T switch, one SP12T switches and 24 LNAs on the transceiver. The cost of supporting such a large number of non-integrated components is so significant that the concept of a global phone supporting all bands used in different world regions and benefitting of economies of scale is fairly unlikely to become a reality.

On a 100% filter-less implementation the (NA×NHD) filters/duplexers and equal number of associated LNAs would be replaced by a much smaller number wideband LNAs. The number would be proportional to band regions and number of Rx antenna s being supported. For example, as shown in FIG. 3, a HD transceiver with 2 Rx antennas covering 4 bands in the 700-1000 MHz region, 4 bands in the 1700-2.1 GHz region and 4 bands in the 2.2-2.6 GHz regions would typically require no Rx filters, two PAs, no PA switches, one SP5T antenna switch, one SP3T switch and only 3 pairs of wideband LNAs.

Unfortunately filter-less implementations are only applicable to HD-FDD and HD-TDD operation but not to FD-FDD. As a result of this, WCDMA/HSPA+ and FDD LTE are not in a position to benefit from filter-less implementation. This is because it is not possible for the LNA to tolerate the presence of the local Tx signal which acts as a really strong out-of-band blocker whose average power is in the order of 24 dBm. Unless some filtering is provided to bring this power down to lower levels that the LNA will tolerate, it is impossible to operate in full duplex FDD mode.

Partial Filter-Less Implementations—Feasibility

While a part-filter-less solution applied to the HD subset of bands (i.e. those dedicated to GSM/GPRS/EDGE, TD-SCDMA, and TD-LTE) does provide some benefit, such benefit is still nowhere near the cost/performance/power efficiency attained by a fully filter-less transceiver described in the previous section. Continuing with the previous example, if 50% of the supported bands operate in HD mode (2 out of 4 on each band region), then the settings are the following:

HD bands: zero duplexers or Rx filters, two SP3T switches and 3 pairs of LNAs

FD bands: 8 duplexers and 8 Rx filters, and associated 16 LNA pairs

One SP11T and one SP10T antenna switches

Two PAs and small PA switches

Therefore a hybrid solution as shown in FIG. 4 will still require a total of 2 antennas, 6 duplexers, 6 Rx filters and 18 LNAs, which is very unlikely to happen for cost-sensitive high-volume consumer markets.

The preceding examples illustrate how FD operation is an obstacle for the development of economies of scale when addressing a large global cost-sensitive market with minimal UE design customization. This is due to the cost of addressing regional variations through Rx filter/duplexer customization for the relevant regional subset of FD-FDD bands.

Therefore, there is a desire to further expand and support the half duplex operation for benefiting from the advantages discussed above.

SUMMARY OF THE INVENTION

The invention simplifies the UE radio front end module for a cellular handset or dongle and enabling Half Duplex operation by modifying the existing 3GPP specifications for LTE and WCDMA/HSPA+. The invention enables Half Duplex operation to be provided without mandating upgrades to deployed existing base stations by signaling UE implicit or explicit information on support of half duplex frequency division duplex (HD-FDD) operation. The instant invention further prevents HD UEs from attaching to any base stations which do not support HD operations. The instant invention further provides inter-frequency cell search periods for enabling HD UEs to have the opportunity to communicate with any other base stations/cells supporting HD operations. The instant invention further enables the HSPA+ system to support the HD-FDD mode.

The current invention provides a method in a wireless communication network comprising at least one base station (BS) and at least one user equipment (UE), the method comprises broadcasting a message by the at least one BS to the at least one UE for indicating supporting of half duplex frequency division duplex (HD-FDD) operation.

The current invention further provides a method in a wireless communication network comprising at least one base station (BS) and at least one user equipment (UE), where the BS supports at least HD-FDD operation, the method comprises scheduling transmissions from the UE such that a plurality of intra-frequency monitoring periods are made available to the UE, wherein each intra-frequency monitoring period has a duration and frequency that are defined by the BS; and wherein no UE transmission activity is scheduled during the plurality of intra-frequency monitoring periods.

The current invention further provides a method in a wireless communication network comprising at least one base station (BS) and at least one user equipment (UE), where the BS supports at least HD-FDD operation and the UE supports at least HD-FDD operation, the method comprises creating a plurality of transmission gaps by the UE, wherein the plurality of transmission gaps created by the UE meet restrictions defined by the BS.

The current invention further provides a method in a wireless communication network comprising at least one base station (BS) supporting at least HSPA+ mode and at least one user equipment (UE) not supporting FD-FDD operation in HSPA+ mode, the method comprises signaling by the at least one UE to the at least one BS indicating that the UE does not support FD-FDD operation in HSPA+ mode.

The current invention further provides a method in a wireless communication network comprising at least one base station (BS) supporting at least HSPA+ mode and at least one user equipment (UE) supporting HD-FDD operation in HSPA+ mode, the method comprises signaling by the least one UE to the at least one BS indicating that the UE supports HD-FDD operation in HSPA+ mode.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The scope of this invention is focused on enabling simplifications to the UE radio front end module for the cellular handset or dongle through modification of the existing 3GPP specifications for LTE and WCDMA/HSPA+ to support half duplex (HD) operation. The option to support HD operation is provided without mandating upgrades to all existing base stations that have already been deployed. The instant invention further prevents HD UEs from attaching to any base stations which do not support HD operations. The instant invention further provides inter-frequency cell search periods for enabling HD UEs to communicate with any base stations/cells supporting HD operations. The instant invention further enables the HSPA+ system to support the HD-FDD mode.

The following section discloses techniques and methods that can be implemented in a base-station/eNodeB of a cellular network operating LTE and/or WCDMA standards to ease the implementation and operation of a UE supporting HD.

Part 1—Enabling Half Duplex Operation in LTE FDD Paired Bands

A number of FD-only FDD LTE base stations have already been deployed by network operators. This means that it is no longer possible for a HD-only FDD LTE UE implemented using a low-complexity radio front end such as a filter-less receiver to tell apart a base station that supports HD FDD mode in which it can operate from and FD-only base station in which it cannot operate.

Figure 1:
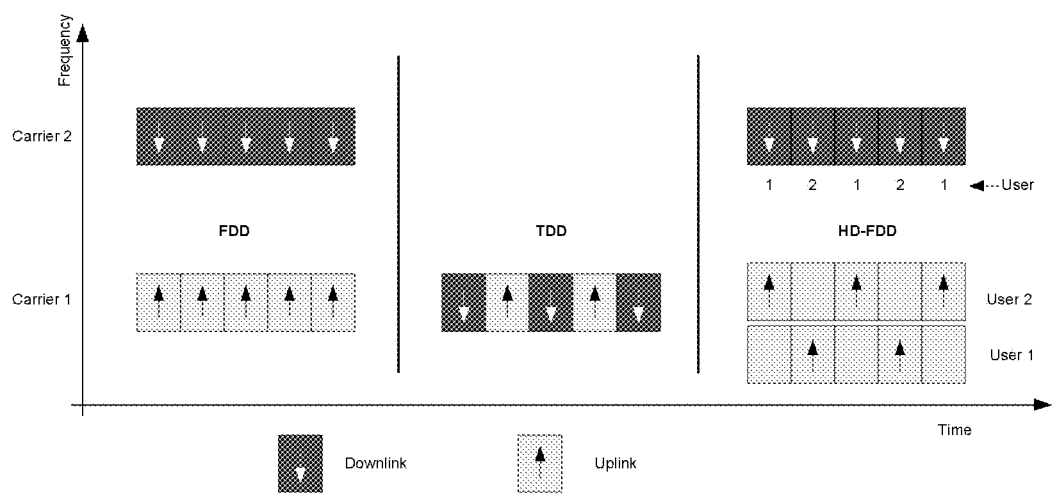
FIG. 1 is timing diagram of a conventional practice illustrating the FDD operation and the necessary separation between HD uplink and HD downlink signal paths
Figure 2:
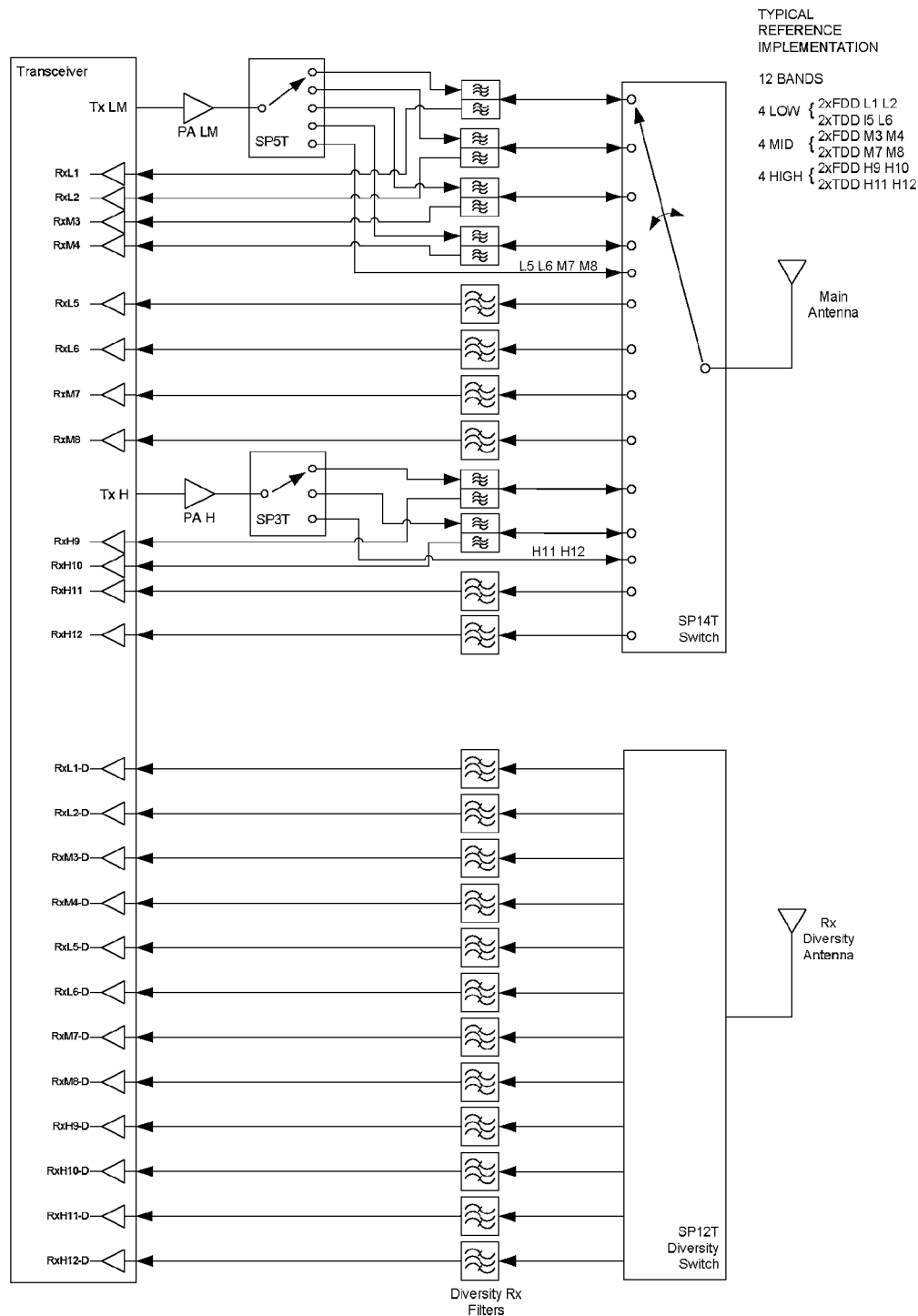
FIG. 2 is a schematic diagram of a conventional practice of a dual-PA implementation.
Figure 3:
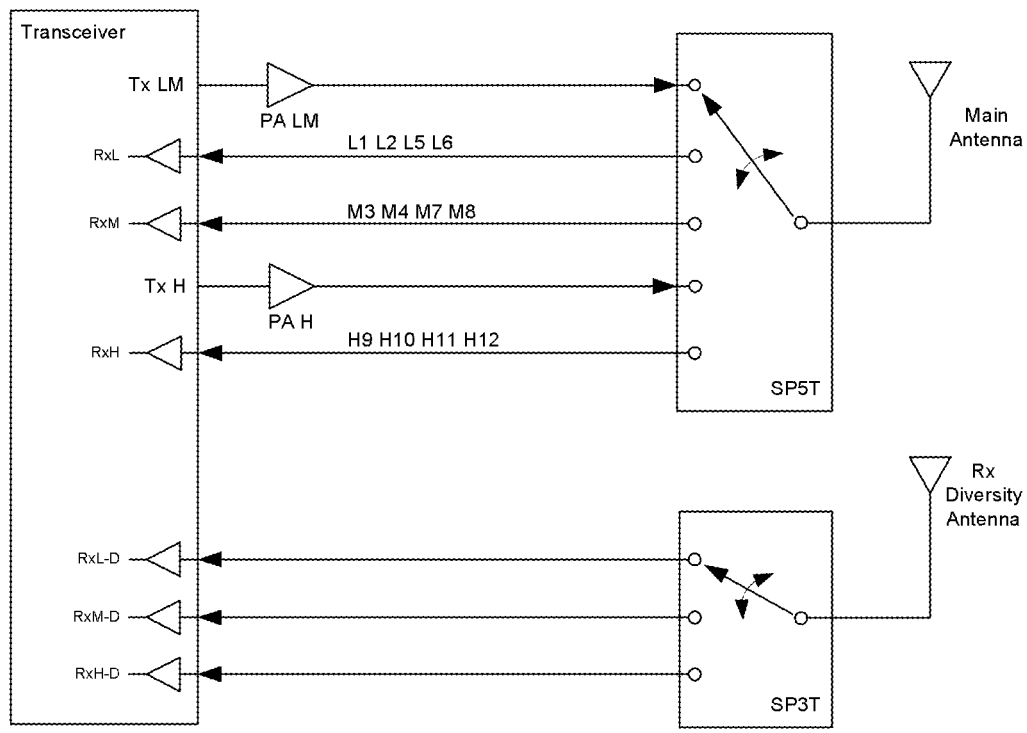
FIG. 3 is a schematic diagram of a conventional practice of a HD transceiver with 2 Rx antennas covering 4 bands.
Figure 4:
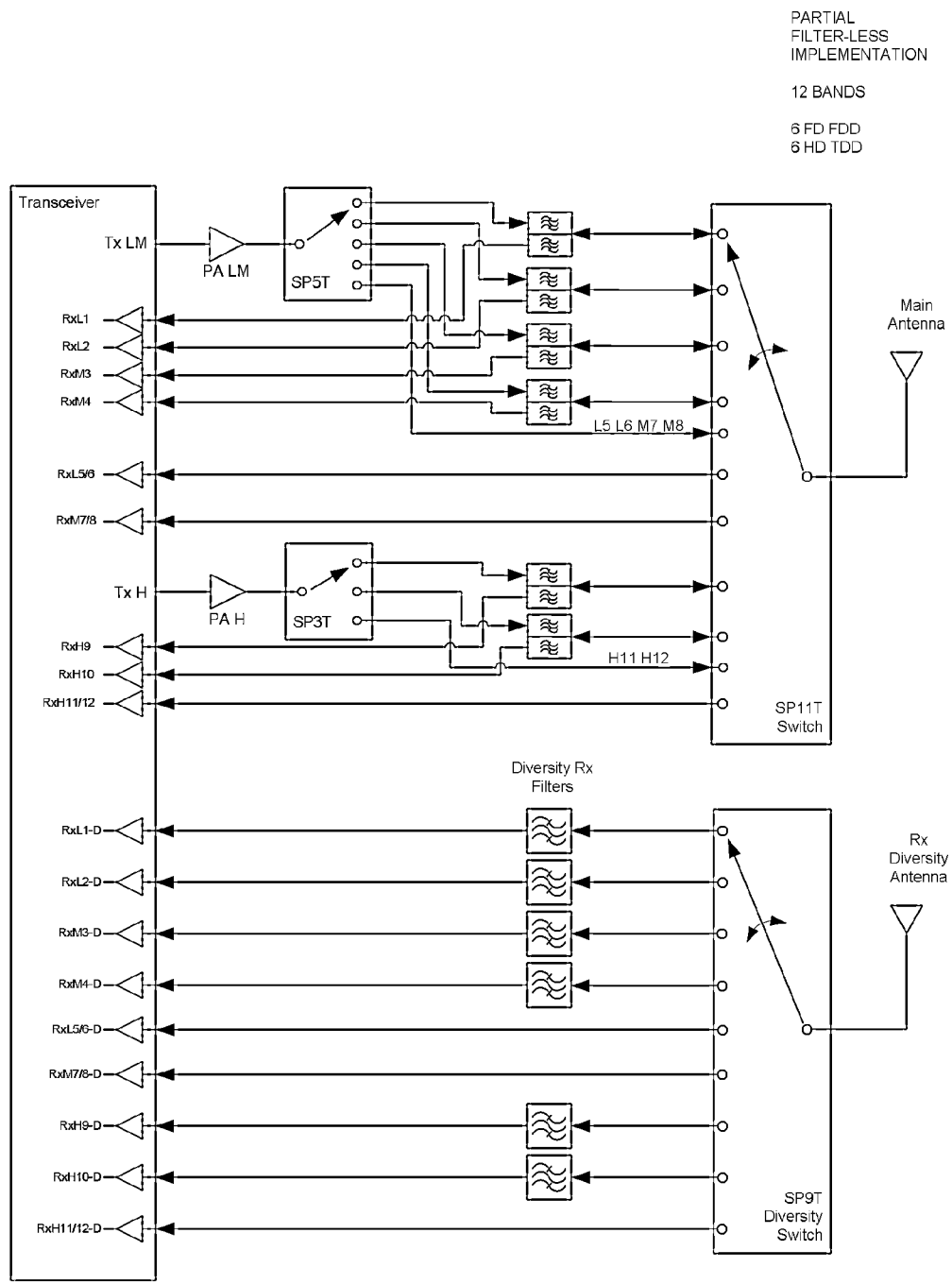
FIG. 4 is a schematic diagram of a conventional practice a hybrid solution with a total of 2 antennas, 6 duplexers, 6 Rx filters and 18 LNAs.
Figure 5:
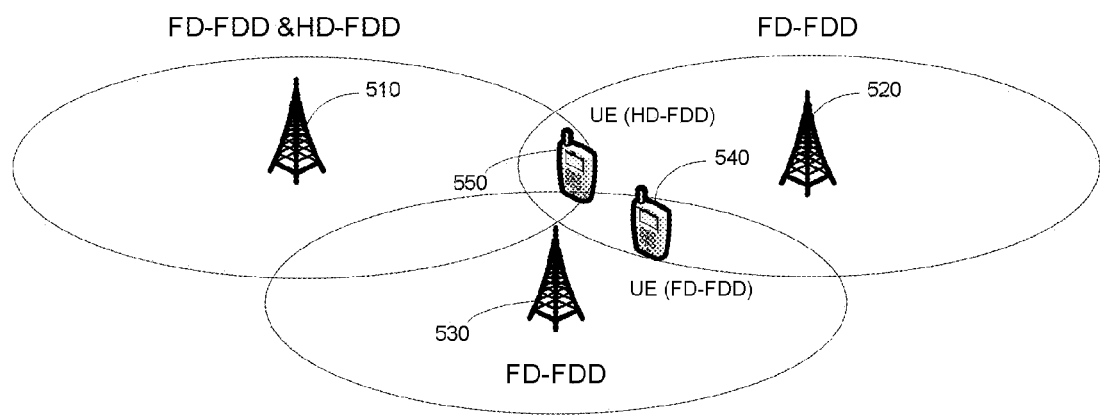
FIG. 5 is a schematic diagram of a cellular communication system for the instant invention.

FIG. 5 shows an example cellular communication system where a mixture of UEs supporting FD-FDD and HD-FDD duplex modes communicate with a mixture of base stations supporting FD-FDD and HD-FDD duplex modes. The base stations 520 and 530 support FD-FDD duplex mode only whereas base station 510 supports both FD-FDD and HD-FDD duplex modes of operation. The UE 540 supports FD-FDD duplex mode of operation and hence can communicate with any of the three base stations 510, 520 and 530. On the other hand, UE 550 supports HD-FDD duplex mode and hence can only communicate with base station 510 and cannot connect to either base station 520 or base station 530. Hence, it will be beneficial to provide mechanisms allowing the UE 550 to detect that base stations 520 and 530 don't support HD-FDD duplex mode so that it avoids trying to connect to these base stations.

To achieve Half Duplex operation, eNode-B scheduling should be such that it is guaranteed that any uplink (UL) transmission will not be immediately preceded by Rx activity in the previous subframe without a large enough gap to stop Rx activity before Tx activity is initiated. For example, according to the present invention, the eNode-B scheduling guarantees that any PDSCH data reception in the UE is limited to subframes which aren't immediately preceding a subframe with uplink transmission.

Likewise, eNode-B scheduling should be such that it is guaranteed than any Rx processing activity at the UE will not be immediately preceded by Tx activity in the previous subframe without a large enough gap to stop Rx activity before Tx activity is initiated. This may be achieved by allowing UEs supporting HD operation to drop a number of samples at the end of a transmission period in order to create a gap before the Rx activity.

In addition to the points above and according to the present invention, the eNode-B scheduling should be such that individual UEs will be guaranteed to be periodically granted intra-frequency and inter-frequency cell search periods in excess of 4 ms during which it is not required to transmit. During intra-frequency cell search periods Rx activity to monitor other intra-frequency channels may take place. The eNode-B may make the UE aware of the scheduling of such a monitoring period.

In this embodiment of the present invention, a wireless communication network system with half duplex capability is provided while it implements the LTE standard for wireless communication of high speed data. The wireless communication network system of the present invention comprises a base station (BS) and a plurality of user equipments (UE). The BS can be compatible to operate concurrently with both HD-FDD UEs and also existing FD-FDD UEs.

The FDD LTE base station broadcasts or signals to UEs whether or not a base station group has a HD-FDD capability. A base station group is a set of base stations characterized by a common feature (e.g. same frequency layer, same size, same area, same network), and can have any number of base stations from a single base station, to all the base stations belonging to one or more LTE networks. Broadcasting or signaling Half Duplex capability on a base station group can be achieved through different embodiments.

In a first embodiment, a specific information element is provided as one Information Element within a specific System Information Block (SIB) carried by Broadcast Channel (BCH), which indicates that the base station group does support the Half Duplex FDD operation. The BCH is transmitted over the Physical Downlink Shared Channel (PDSCH).

In a second embodiment, one or more of the currently available spare bits is used in the Physical Broadcast Channel (PBCH) carrying the Master Information Block (MIB) to broadcast to all the UEs for indicating that the base station group does support the Half Duplex operation. This embodiment further provides the additional benefits of reducing duration and power consumption on HD-only UEs during network searching. This is because that a candidate network carrier can be discarded if not HD-capable even before decoding a System Information Block in the BCH channel. Note that the signaling of support of HD-FDD duplex mode of operation using at least one spare bit in the MIB can be performed by setting the at least one bit to a specific value, which is known by the UE for identifying the HD-FDD support. It would also be possible to apply a mask to the MIB message in order to indicate HD-FDD support and detection of this mask could be performed by the UE by looking at the values of the spare bits.

In a third embodiment, a specific information element within dedicated signaling sent to a UE as part of any signaling procedure between a UE and the base station is used to indicate if a base station group supports Half Duplex LTE FDD operation.

In a fourth embodiment, any other implicit or explicit information-bearing means within the downlink signal able to convey information on UE half duplex capability is used to indicate if a base station group supports Half Duplex LTE FDD operation.

To be noted, all the above embodiments are backwards-compatible with legacy UEs that do not support half duplex operation and enable incremental roll-out of HD-capable base stations, while allowing HD-only LTE UEs to discard any non-HD-capable base stations during the search phase.

Part 2—Enabling WCDMA/HSPA+ Half Duplex Operation Within FDD Paired Bands

WCDMA/HSPA+ has been designed for FD-FDD operation in mind. Its initial implementation for Releases 99/4/5/6 requires concurrent Rx and Tx operation nearly 100% of the time (excluding compressed mode gaps periods) when data is being transmitted and received in connected state (known as Cell_DCH). An overview for WCDMA, HSDPA, HSUPA and HSPA+ can be found in [6], which contains further references to the relevant 3GPP specifications (25.xxx series).

More recently, the Release 7 standalone HSPA+ operation has been specified, which enables data Rx/Tx operation within the HSPA channels without requiring the presence of legacy Release 99/4/5/6 channels such as Downlink DPCCH/DPDCH and Uplink DPDCH/DPCCH. This is a significant change because legacy channels mandate concurrent Rx/Tx activity (and hence Full Duplex FDD operation), whereas HSPA+-specific channels allow for Half-Duplex operation if bespoke HD-specific rules are added to the specifications.

HSDPA (High Speed Downlink Data Packet Access) activity is organized around a set of multiple independent HARQ processes, each operating on a different downlink Transmission Time Interval (TTI). At any one point in time each HARQ process is in charge of the correct delivery of a Downlink Transport block or MAC PDU to higher layers. The correct delivery of transport block of data by one HARQ process involves one or more Rx reception periods in which HS-DSCH, F-DPCH, and HS-DPCCH are monitored by the UE, and one or more Tx periods carrying ACK or NACK over the HS-DPCCH. A Tx period never overlaps with an Rx period since they are always located at a fixed, pre-determined delay with respect to the downlink. Simultaneous Rx and Tx activity remains possible whenever more than one HARQ process is active on different TTIs.

Likewise, HSUPA (High Speed Uplink Data Packet Access) transmission is also organized around a set of independent HARQ processes that operate concurrently on different TTIs. At any one point in time each HARQ process is in charge of the correct delivery of an uplink transport block or MAC PDU to higher layers. The correct delivery of one transport block typically involves the reception of a number of Rx channels including E-AGCH, ERGCH and E-HICH, and data Tx data transmission on E-DCH.

On a later standard release it is possible to modify the existing WCDMA 3GPP HSPA+ scheduling rules in the specifications and impose rules customized for Half Duplex operation. Restrictions on the timing and number of active HARQ processes used by the MAC scheduler for HSDPA and HSUPA operation can be such that a UE is guaranteed by design not to be required to transmit and receive simultaneously, and hence effectively it can operate in Half Duplex mode.

To achieve HSPA+ FDD Half Duplex operation Rx and Tx activity scheduling should be such that it is guaranteed than any UL transmission will not be immediately preceded by Rx activity in the previous subframe without a large enough gap to stop Rx activity before Tx activity is initiated. Likewise, Rx and Tx activity scheduling should be such that it is guaranteed than any DL transmission will not be immediately preceded by Tx activity in the previous subframe without a large enough gap to stop Rx activity before Tx activity is initiated. In addition to this, a UE should be guaranteed to be granted periodic intra-frequency and inter-frequency cell search periods in excess of 4 ms during which it is not required to transmit. During intra-frequency cell search periods Rx activity to monitor other intra-frequency channels may take place.

In a fifth embodiment, a specific information element is provided inside one Information Element within a specific System Information Block (SIB) carried by Broadcast Channel (BCH) to indicate that a base station group HSPA+ supports half duplex operation. The BCH is transmitted over the Primary Common Control Physical Channel (PCCPCH).

In a sixth embodiment, a specific information element within dedicated signaling sent to a UE as part of any signaling procedure between a UE and the base station is used to indicate if a base station group supports Half Duplex FDD HSPA+ operation.

In a seventh embodiment a dedicated portion of the downlink orthogonal variable spreading factor (OVSF) code tree is used to signal whether a base station group supports Half Duplex FDD HSPA+ operation. For example, a pre-defined sequence of bits, known to the UE, may be transmitted by the base-station using one or more of a defined set of downlink OVSF codes. The UE can then blindly try and identify the presence/absence of this message in the defined set of downlink OVSF code in order to detect whether the base-station support HD operation or not. Note that such a technique can be implemented as a complement to the other approaches described in the earlier embodiments.

In a eighth embodiment, any other implicit or explicit information-bearing means within the downlink signal able to convey information on UE half duplex capability is used to indicate if a base station group supports Half Duplex FDD HSPA+ operation.

In a ninth embodiment combined with any of the previous embodiments, a WCDMA HSPA+ UE signals its half duplex capability to the network.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method in a wireless communication network comprising a first base station and a user device, the method comprising:

signaling using a message by said first base station to said user device for indicating support of half duplex frequency division duplex (HD-FDD) operation; and configuring said first base station to support concurrently said HD-FDD operation and a second duplex operation comprising a full duplex frequency division duplex (FD-FDD) operation or a time division duplex (TDD) operation;

wherein the message is carried by a predefined portion of an orthogonal variable spreading factor (OVSF) tree, and said signaling using said message further comprises sending said message from said first base station to said user device by a second base station with a base station group comprising said first base station;

wherein when said user device receiving said message is a HD-FDD device, said user device does not discard said first base station during a search phase; and wherein said base station group is characterized by a common frequency layer, a common size, a common area and a common network.

2. The method of claim 1, wherein said first base station supports an LTE FDD mode.

3. The method of claim 1, wherein said first base station supports an HSPA+mode.

4. The method of claim 1, wherein the message is transmitted over a broadcast channel.

5. The method of claim 1, wherein said message is transmitted over a channel dedicated to said user device.

6. The method of claim 4, wherein said message comprises an Information Element within a System Information Block mapped to a Broadcast Channel.

7. The method of claim 4, wherein said message comprises a bit in a Master Information Block transmitted over a Physical Broadcast Channel.

8. The method of claim 4, where said message is transmitted to said user device using a Physical Downlink Shared Channel.

9. A method in a wireless communication network comprising a base station supporting HSPA+mode and a user device not supporting FD-FDD operation in HSPA+mode, the method comprising:

configuring said base station to support concurrently said HD-FDD operation and a second duplex operation comprising a full duplex frequency division duplex (FD-FDD) operation or a time division duplex (TDD) operation; and signaling by said user device to said base station using a predefined portion of an orthogonal variable spreading factor (OVSF) tree indicating that said user device does not support FD-FDD operation in HSPA+mode;

wherein said signaling by said user device further comprises sending said message via a second base station with a base station group comprising said first base station; and wherein said base station group is characterized by a common frequency layer, a common size, a common area and a common network.

10. The method of claim 9, wherein said signaling further comprises:

signaling to said base station that said user device supports HD-FDD operation in HSPA+mode.

11. The method of claim 9, wherein said signaling further comprises:

signaling by said user device that HD-FDD operation is specified for multiple frequency bands.

12. A method in a wireless communication network comprising a base station supporting HSPA+mode and a user device supporting HD-FDD operation in HSPA+mode, the method comprising:

configuring said base station to support concurrently said HD-FDD operation and a second duplex operation comprising a full duplex frequency division duplex (FD-FDD) operation or a time division duplex (TDD) operation; and signaling by said user device to said base station using a predefined portion of an orthogonal variable spreading factor (OVSF) tree indicating that said user device supports HD-FDD operation in HSPA+mode;

wherein said signaling by said user device further comprises sending said message via a second base station with a base station group comprising said first base station; and wherein said base station group is characterized by a common frequency layer, a common size, a common area and a common network.

13. The method of claim 12, wherein said signaling further comprises:

signaling by said user device that HD-FDD operation is specified for multiple frequency bands.

\* \* \* \* \*